(12) United States Patent
Matsuzaki et al.

(10) Patent No.: US 12,458,306 B2
(45) Date of Patent: Nov. 4, 2025

(54) X-RAY IMAGING DEVICE AND TREATMENT TOOL RECOGNITION METHOD

(71) Applicant: FUJIFILM Healthcare Corporation, Kashiwa (JP)

(72) Inventors: Kazuki Matsuzaki, Chiba (JP); Toru Shirai, Chiba (JP)

(73) Assignee: FUJIFILM Healthcare Corporation, Tokyo (JP)

(*) Notice: Subject to any disclaimer, the term of this patent is extended or adjusted under 35 U.S.C. 154(b) by 485 days.

(21) Appl. No.: 17/454,633

(22) Filed: Nov. 12, 2021

(65) Prior Publication Data

US 2022/0175338 A1 Jun. 9, 2022

(30) Foreign Application Priority Data

Dec. 9, 2020 (JP) ................. 2020-204258

(51) Int. Cl.
*A61B 6/12* (2006.01)
*A61B 6/00* (2006.01)
(Continued)

(52) U.S. Cl.
CPC .............. *A61B 6/12* (2013.01); *A61B 6/5217* (2013.01); *A61B 6/5264* (2013.01); *A61B 6/545* (2013.01);
(Continued)

(58) Field of Classification Search
CPC ... A61B 2034/2065; A61B 34/20; A61B 6/12; A61B 6/4441; A61B 6/5217;
(Continued)

(56) References Cited

U.S. PATENT DOCUMENTS 9,867,588 B2 * 1/2018 Amiri .................... A61B 6/584
10,716,631 B2 * 7/2020 Tolkowsky .......... A61B 8/4416
(Continued)

FOREIGN PATENT DOCUMENTS

CN     103300870 A     9/2013
CN     104023629 A     9/2014
(Continued)

OTHER PUBLICATIONS

Chinese official action dated May 22, 2024 (and English translation thereof) in connection with Chinese Patent Application No. 202111471867l.

(Continued)

*Primary Examiner* — Zhiyu Lu
(74) *Attorney, Agent, or Firm* — Paul Teng

(57) ABSTRACT

Provided is a technique capable of calculating a three-dimensional position of a treatment tool only by processing an X-ray image without using an external signal of a body movement monitor or the like and capable of eliminating an influence of body movement. A plurality of combinations of a plurality of X-ray images from a plurality of X-ray images acquired at different angles or times are used to obtain a parameter serving as an index of calculation accuracy of a three-dimensional position of a treatment tool for each combination and to calculate the three-dimensional position of the treatment tool based on a combination of X-ray images serving as a parameter having the highest accuracy.

16 Claims, 13 Drawing Sheets

(51) Int. Cl.
*A61B 34/20* (2016.01)
*G06T 7/00* (2017.01)
*G06T 7/73* (2017.01)

(52) U.S. Cl.
CPC ............ *A61B 34/20* (2016.02); *G06T 7/0016* (2013.01); *G06T 7/73* (2017.01); *A61B 6/4441* (2013.01); *A61B 2034/2065* (2016.02); *G06T 2207/10116* (2013.01); *G06T 2207/30021* (2013.01)

(58) Field of Classification Search
CPC .................. A61B 6/5264; A61B 6/545; G06T 2207/10116; G06T 2207/30021; G06T 7/0016; G06T 7/73
See application file for complete search history.

(56) References Cited

U.S. PATENT DOCUMENTS

| | | | |
|---|---|---|---|
| 11,801,114 B2* | 10/2023 | Lang | A61B 90/98 |
| 2010/0014628 A1* | 1/2010 | Kadomura | A61B 6/032 |
| | | | 378/4 |
| 2010/0067739 A1 | 3/2010 | Mostafavi et al. | |
| 2013/0237810 A1 | 9/2013 | Iwai et al. | |
| 2013/0243153 A1 | 9/2013 | Sra et al. | |
| 2014/0177785 A1* | 6/2014 | Funk | A61B 6/035 |
| | | | 378/9 |
| 2016/0140720 A1* | 5/2016 | Naito | A61B 6/5211 |
| | | | 382/132 |
| 2017/0200271 A1* | 7/2017 | Atria | A61B 6/032 |
| 2017/0245822 A1* | 8/2017 | Vaillant | A61B 5/7289 |
| 2018/0250076 A1* | 9/2018 | Gemmel | G06T 19/00 |
| 2018/0308247 A1* | 10/2018 | Gupta | G06T 7/62 |
| 2019/0143146 A1* | 5/2019 | Fujii | A61N 5/1049 |
| | | | 600/1 |
| 2019/0350657 A1* | 11/2019 | Tolkowsky | A61B 90/39 |
| 2020/0226779 A1* | 7/2020 | Matsuzaki | A61B 6/12 |
| 2020/0405399 A1* | 12/2020 | Steinberg | G06T 7/33 |
| 2021/0097668 A1* | 4/2021 | Pollock | G06T 7/344 |
| 2021/0386480 A1* | 12/2021 | Tolkowsky | A61B 46/20 |

FOREIGN PATENT DOCUMENTS

| | | |
|---|---|---|
| CN | 111093505 A | 5/2020 |
| JP | 2012-508035 A | 4/2012 |
| JP | 5587861 | 9/2014 |
| JP | 2016-178986 A | 10/2016 |
| JP | 2017-143872 A | 8/2017 |
| JP | 2018-068982 A | 5/2018 |

OTHER PUBLICATIONS

Japanese official action dated Jun. 4, 2024 (and English translation thereof) in connection with Japanese Patent Application No. 2020-204258.

* cited by examiner

X-RAY IMAGING DEVICE AND TREATMENT TOOL RECOGNITION METHOD

BACKGROUND OF THE INVENTION

1. Field of the Invention

The present invention relates to an x-ray imaging device, and more particularly to a technique of grasping a three-dimensional position of a treatment tool when performing X-ray imaging while inserting the treatment tool into an inspection object.

2. Description of the Related Art

An X-ray imaging device can grasp a characteristic structure of a subject in real time, and is widely used as an imaging unit (interventional imaging unit) during treatment such as surgery. In imaging during treatment, it is extremely important to grasp a position of a treatment tool with respect to the subject. Although in the X-ray imaging device, a position of the treatment tool in a projection plane can also be grasped in real time based on the treatment tool projected in an X-ray image, it is difficult to grasp a position and a structure of the treatment tool in a projection direction.

On the other hand, a cone beam CT can acquire a three-dimensional image by rotating an X-ray source and a detector around the subject, and can grasp a three-dimensional position of the treatment tool based on the image. However, the cone beam CT may require time to acquire one image as compared with the X-ray imaging device, and positional accuracy of the treatment tool decreases when a body of the subject moves during the rotation.

Japanese Patent No. 5587861 (PTL 1) discloses a technique of, using X-ray images acquired based on different perspectives, calculating the depth (three-dimensional position) of a treatment tool based on a positional relationship of the treatment tool in the X-ray images. Also in this technique, accuracy of position calculation may deteriorate when time phases of the body movements at the time of the acquisition are different between the two X-ray images used for calculating the three-dimensional position.

In order to reduce an influence of the body movement at the time of calculating the three-dimensional position, it is considered that imaging is performed while a cycle of a respiratory movement or the like is monitored by an external device. However, in intraoperative imaging, it is preferable that a monitor instrument or the like other than the treatment tool is not disposed as much as possible in a space where a treatment is performed, and it is necessary to add a unit that captures an external signal on an x-ray imaging device side.

SUMMARY OF THE INVENTION

An object of the invention is to provide a technique capable of calculating a three-dimensional position of a treatment tool only by processing an X-ray image without using an external signal such as a body movement monitor and capable of eliminating an influence of a body movement, and accordingly provide an x-ray imaging device capable of accurately indicating the treatment tool while performing continuous imaging.

In order to solve the above problem, according to the invention, a plurality of combinations of a plurality of X-ray images from a plurality of X-ray images acquired at different angles or times are used to obtain a parameter serving as an index of calculation accuracy of a three-dimensional position of a treatment tool for each combination and to calculate the three-dimensional position of the treatment tool based on a combination of X-ray images serving as a parameter having the highest accuracy.

That is, an x-ray imaging device according to the invention includes: an X-ray source that emits X-rays; an X-ray detector that faces the X-ray source across an inspection object; a data processing unit that generates an X-ray image of the inspection object based on the X-rays transmitted through the inspection object and detected by the X-ray detector; and an imaging control unit that controls irradiation and an irradiation angle of the X-rays with respect to the inspection object. In x-ray imaging device, the data processing unit includes a treatment tool position calculation unit that analyzes the X-ray image of the inspection object and that calculates a three-dimensional position of a treatment tool in the inspection object. The imaging control unit controls the X-ray source and the X-ray detector to perform imaging a plurality of times at a plurality of imaging positions having different irradiation angles or within a predetermined angle range of the irradiation angle. The treatment tool position calculation unit includes: a parameter calculation unit that calculates a parameter for three-dimensional position calculation of the treatment tool for each combination using a plurality of combinations of two or more X-ray images having different imaging positions among a plurality of X-ray images obtained by performing the imaging a plurality of times; a parameter comparison unit that compares parameters of the combinations and that selects a combination as a parameter having the highest accuracy of three-dimensional position calculation; and a three-dimensional position calculation unit that calculates a three-dimensional position of the treatment tool using the parameter calculated by the parameter calculation unit for the combination selected by the parameter comparison unit.

A treatment tool recognition method according to the invention is a method of analyzing a plurality of X-ray images obtained by performing imaging a plurality of times at a plurality of imaging positions at which X-ray irradiation angles with respect to an inspection object are different or within a predetermined angle range of the irradiation angles, and recognizing a three-dimensional position of a treatment tool inserted into the inspection object during the X-ray imaging. The treatment tool recognition method includes: a parameter calculating step of calculating a parameter for three-dimensional position calculation of the treatment tool for each combination using a plurality of combinations of two or more X-ray images having different imaging positions among the plurality of X-ray images; a selecting step of selecting, based on the parameter, a combination that is a parameter having the highest accuracy of three-dimensional position calculation among a plurality of combinations; and a step of calculating a three-dimensional position of the treatment tool using the parameter calculated in the parameter calculating step for the combination selected in the selecting step.

According to the invention, a combination with the highest accuracy of the treatment tool position calculation is selected from a plurality of combinations, and the three-dimensional position is calculated using a combination image and an imaging position. Therefore, even if a positional deviation occurs due to an influence of the body movement, the three-dimensional position can be calculated by calculation between images of substantially the same time phase, and the influence of the body movement can be decreased.

DESCRIPTION OF THE PREFERRED EMBODIMENTS

Hereinafter, an embodiment of an x-ray imaging device according to the invention will be described.

Figure 1:
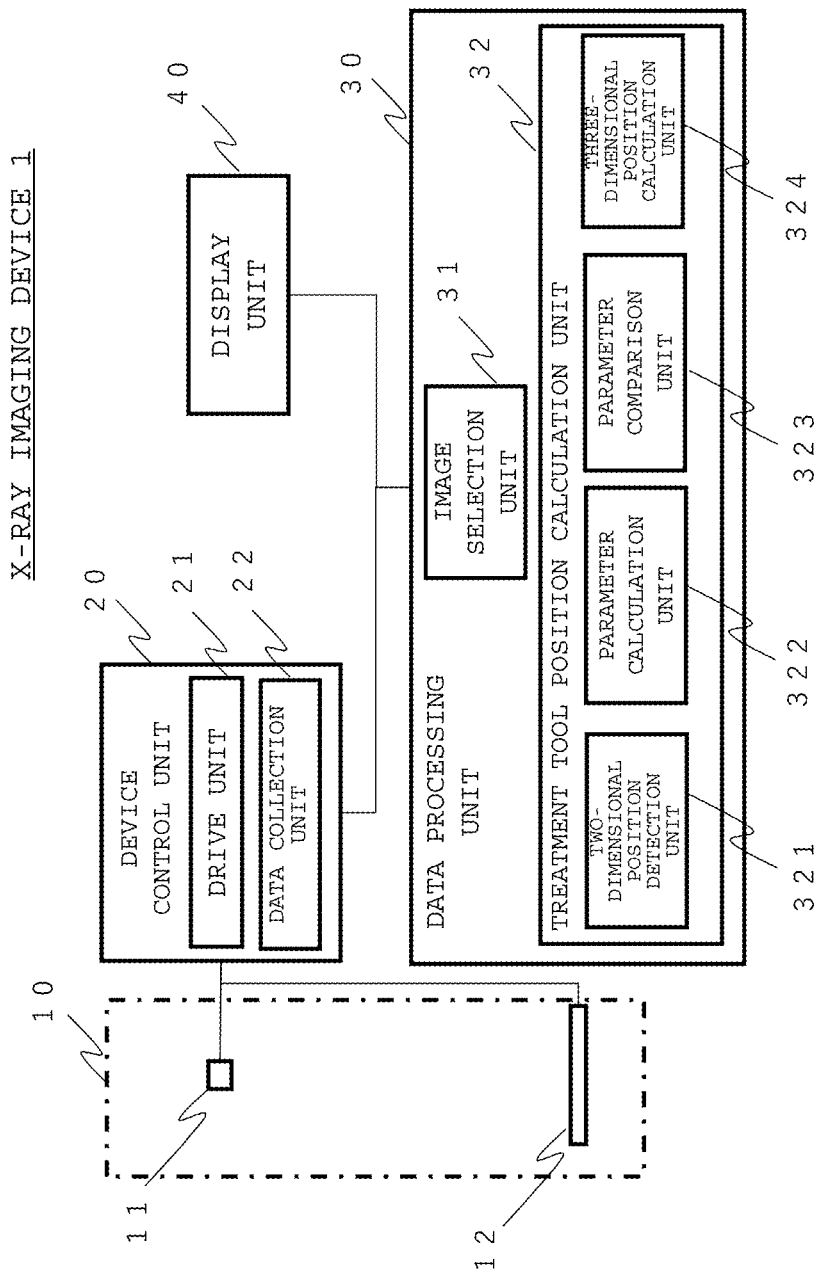
FIG. 1 is a functional block diagram showing an overall configuration of an embodiment of an x-ray imaging device.

As shown in FIG. 1, an x-ray imaging device 1 according to the present embodiment includes an imaging unit 10 including an X-ray source 11 and an X-ray detector 12, a device control unit 20 that controls the entire device including the imaging unit 10, a data processing unit 30 that generates an X-ray image based on the X-rays detected by the X-ray detector 12 and processes image data, and a display unit 40 that displays the X-ray image and the like. Further, although not shown, the device control unit 20 and the data processing unit 30 may be provided with an input device for a user to input a command necessary for processing, a storage device that stores data necessary for processing, a three-dimensional image of a subject acquired in advance, and the like.

An X-ray tube is usually used as the X-ray source 11, and the X-ray tube is connected to a high voltage generator (not shown). As the X-ray detector 12, a flat panel detector (FPD) is used. The X-ray detector 12 is hereinafter also referred to as a detector panel although the invention is not limited thereto.

The x-ray imaging device 1 includes different types of devices depending on a support structure of the X-ray source 11 and the detector panel 12, a position of the X-ray source 11, and the like. However, the embodiment can be applied to any type as long as the position (X-ray irradiation angle) of the X-ray source 11 with respect to the subject can be changed. For example, the invention can be applied to an x-ray imaging device 10A called an overtube fluoroscopy device as shown in FIG. 2A or a C-arm X-ray imaging device 10B as shown in FIG. 3A.

Figure 2A:
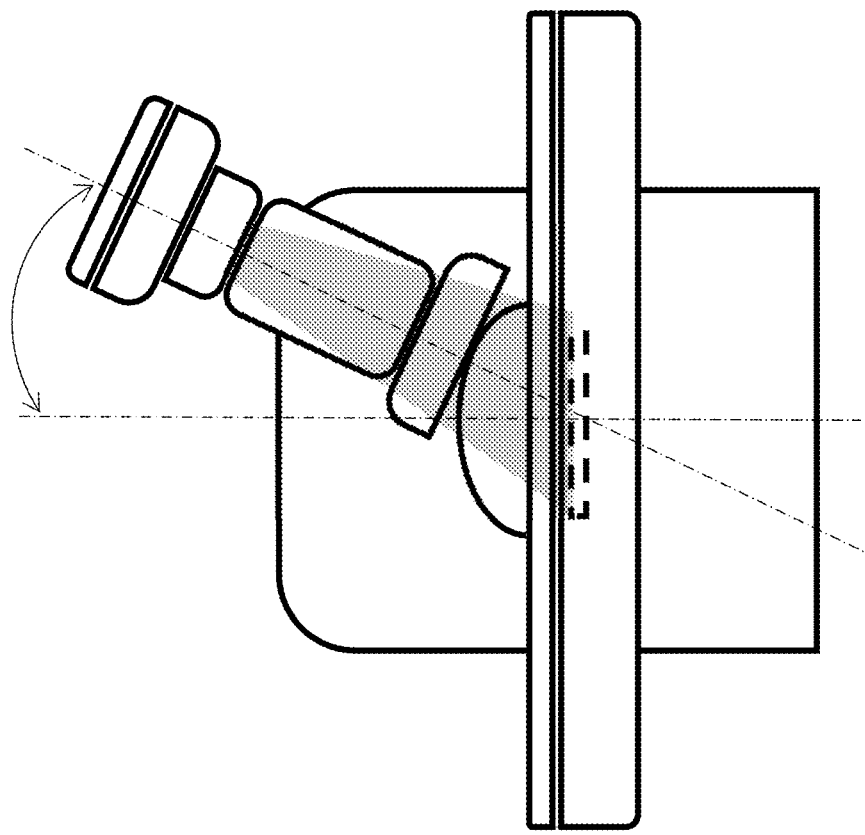
FIG. 2A and FIG. 2B are views showing an overtube type fluoroscopic device as an example of an imaging unit, and show states in which imaging positions (angles) are different from each other.

In the x-ray imaging device 1A shown in FIG. 2A, an X-ray source 11 is set on an upper portion of a bed 13 on which a subject is laid, and a detector panel constituting the X-ray detector 12 is provided inside the bed 13. In the x-ray imaging device 1A, the X-ray source 11 is fixed to a support base 14 via a support mechanism 15, and the support mechanism 15 includes a support 151 that supports the X-ray source 11 and a support arm 152 that supports the support 151 rotatably with respect to the support base 14. The bed 13 accommodating the detector panel 12 is supported by the support arm 152 in a manner of being movable in a horizontal direction and a vertical direction.

Figure 2B:
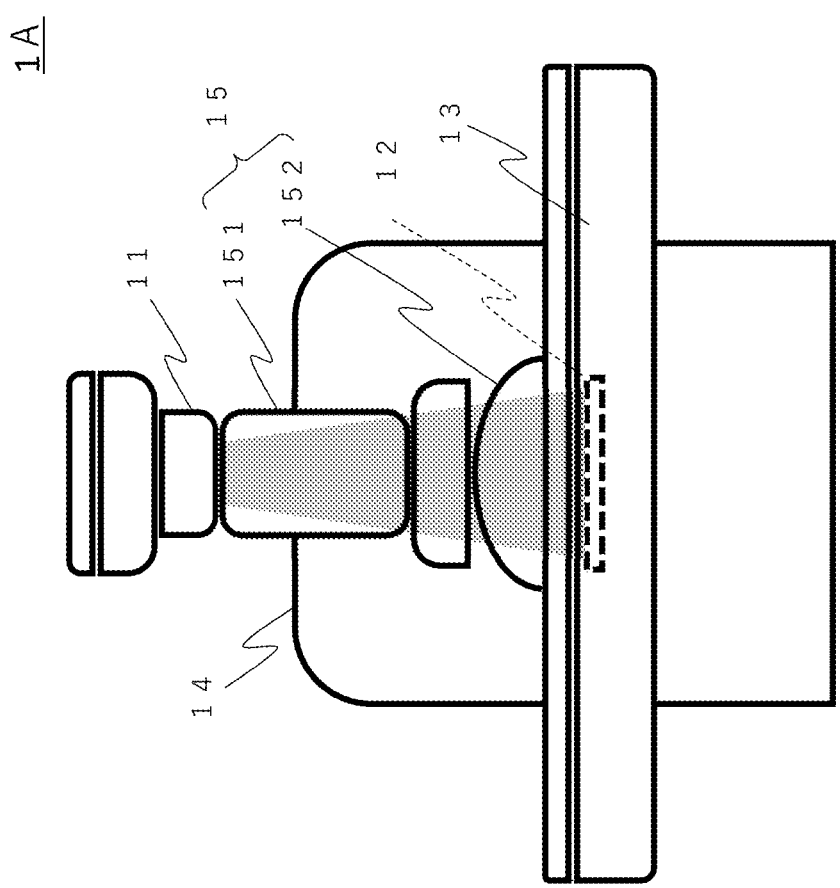

In the x-ray imaging device 1A having such a configuration, by rotating the support 151 with respect to the support base 14, a position of the X-ray source 11 can be changed from a vertical position as shown in FIG. 2A to a position as shown in FIG. 2B, and an X-ray irradiation angle with respect to the subject laid on the bed 13 can be changed. Although not illustrated, a mechanism that moves the support 151 in a direction orthogonal to a paper surface in FIGS. 2A and 2B or rotating the X-ray tube fixed to the support 151 may be provided, and in this case, the X-ray irradiation angle can be changed not only two-dimensionally but also three-dimensionally.

Although FIG. 2A shows an overtube fluoroscopy device that performs irradiating with X-rays from an upper side of the subject, the invention can be similarly applied to an undertube fluoroscopy device in which an X-ray source is disposed on a lower side of the bed.

Figure 3B:
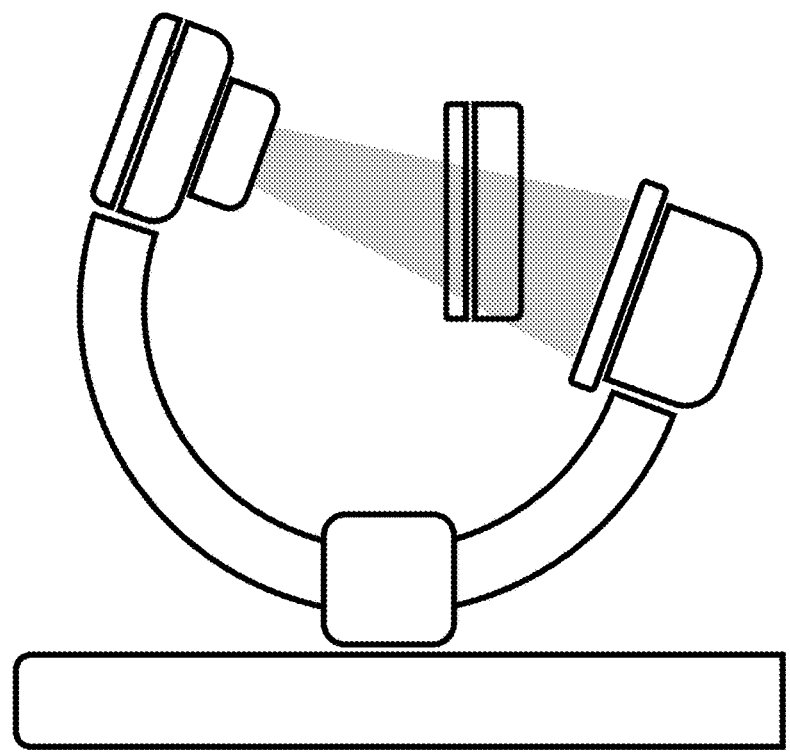
FIG. 3A and FIG. 3B are views showing a C-arm type imaging device as an example of the imaging unit, and show states in which imaging positions (angles) are different from each other.
Figure 3A:
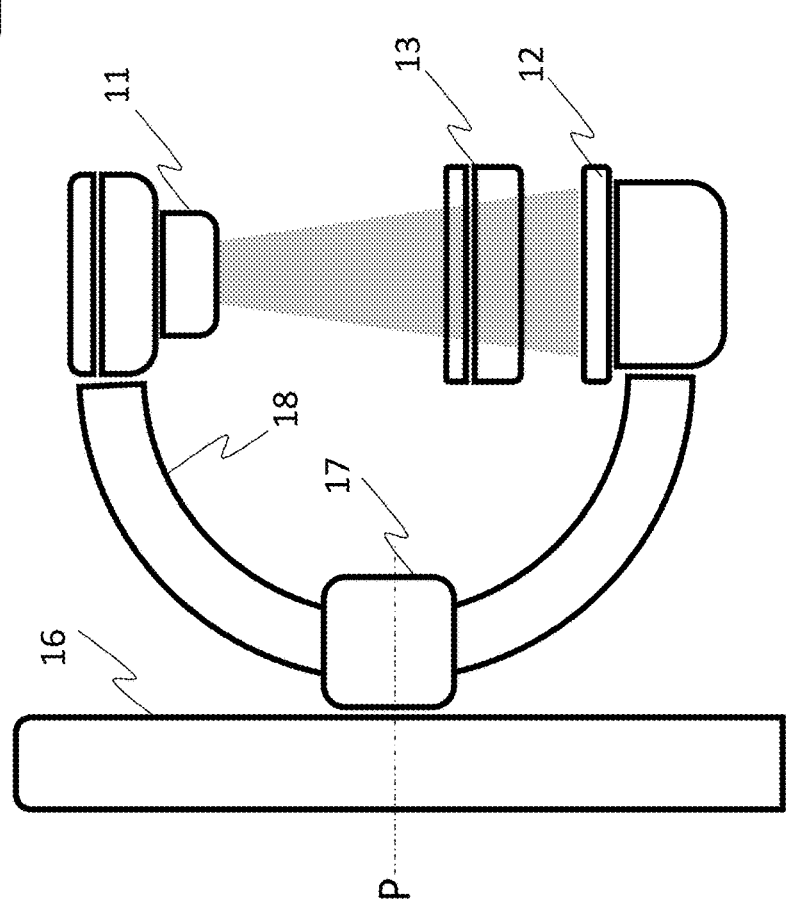

FIG. 3A and FIG. 3B show an x-ray imaging device 1B having a structure in which the X-ray source 11 and the X-ray detector 12 are supported by a C-arm 18. In the x-ray imaging device 1B, the bed 13 on which a subject is laid is disposed in a space between the X-ray source 11 and the X-ray detector 12. The C-arm 18 is fixed to the support base 16 via the support arm 17, and the position of the C-arm 18 supported by the support arm 17 can be changed. Accordingly, the X-ray source 11 changes from a position directly above the bed 13 as shown in FIG. 3A to an inclined position as shown in FIG. 3B, and the X-ray irradiation angle can be changed. The support arm 17 can be rotated around an axis P with respect to the support base 16, whereby the X-ray source 11 and the X-ray detector 12 can be rotated in a plane orthogonal to a paper surface to change the X-ray irradiation angle.

The device control unit 20 includes a drive unit 21 and a data collection unit 22. The drive unit 21 includes a drive source such as a motor that drives a mechanism (for example, the support mechanism 15 in FIGS. 2A and 2B) that supports the X-ray source 11 and the X-ray detector 12 described above, a power supply unit that drives the X-ray source 11, and the like. The data collection unit 22 receives an electric signal corresponding to transmitted X-rays output from the detector panel 12, and collects the electric signal as two-dimensional image data for each imaging time. The device control unit 20 also has a function as an imaging control unit that controls movement of the X-ray source 11 and the X-ray irradiation from the X-ray source 11 by controlling an operation of the drive unit 21. In the present embodiment, in order to detect a position of the treatment tool inserted into the subject during X-ray imaging, a plurality of X-ray images having different imaging times and imaging positions are collected. Therefore, the imaging control unit controls the drive unit 21 in accordance with a predetermined imaging procedure such as an imaging position and the number of times of imaging. Details of the imaging procedure will be described in an embodiment to be described later.

The data processing unit 30 includes an image selection unit 31 that manages the image data collected by the data collection unit 22 for a certain period of time and that selects a combination or a group related to a body movement periodicity of the subject, and a treatment tool position calculation unit 32 that monitors the position of the treatment tool inserted into the subject. The treatment tool position calculation unit 32 according to the present embodiment calculates a three-dimensional position of the treatment tool using a plurality of combinations of two or more X-ray images selected from a plurality of X-ray images having different imaging times and imaging positions. For this reason, the treatment tool position calculation unit 32 includes a two-dimensional position detection unit 321 that detects the position of the treatment tool in each X-ray image, a parameter calculation unit 322 that calculates a parameter for calculating a three-dimensional position for each combination of two or more X-ray images, a parameter comparison unit 323 that compares the parameters calculated for each combination and selects a combination (parameter) to be used for calculation of the three-dimensional position, and a three-dimensional position calculation unit 324 that calculates the three-dimensional position of the treatment tool using the parameter of the selected combination.

The function of the data processing unit 30 can be implemented by a computer including a CPU, a GPU, and a memory reading a program for implementing a function of each unit. A part of operations or a part of the functions provided in each unit may be implemented by hardware such as an application specific integrated circuit (ASIC) or a field programmable gate array (FPGA).

Figure 4:
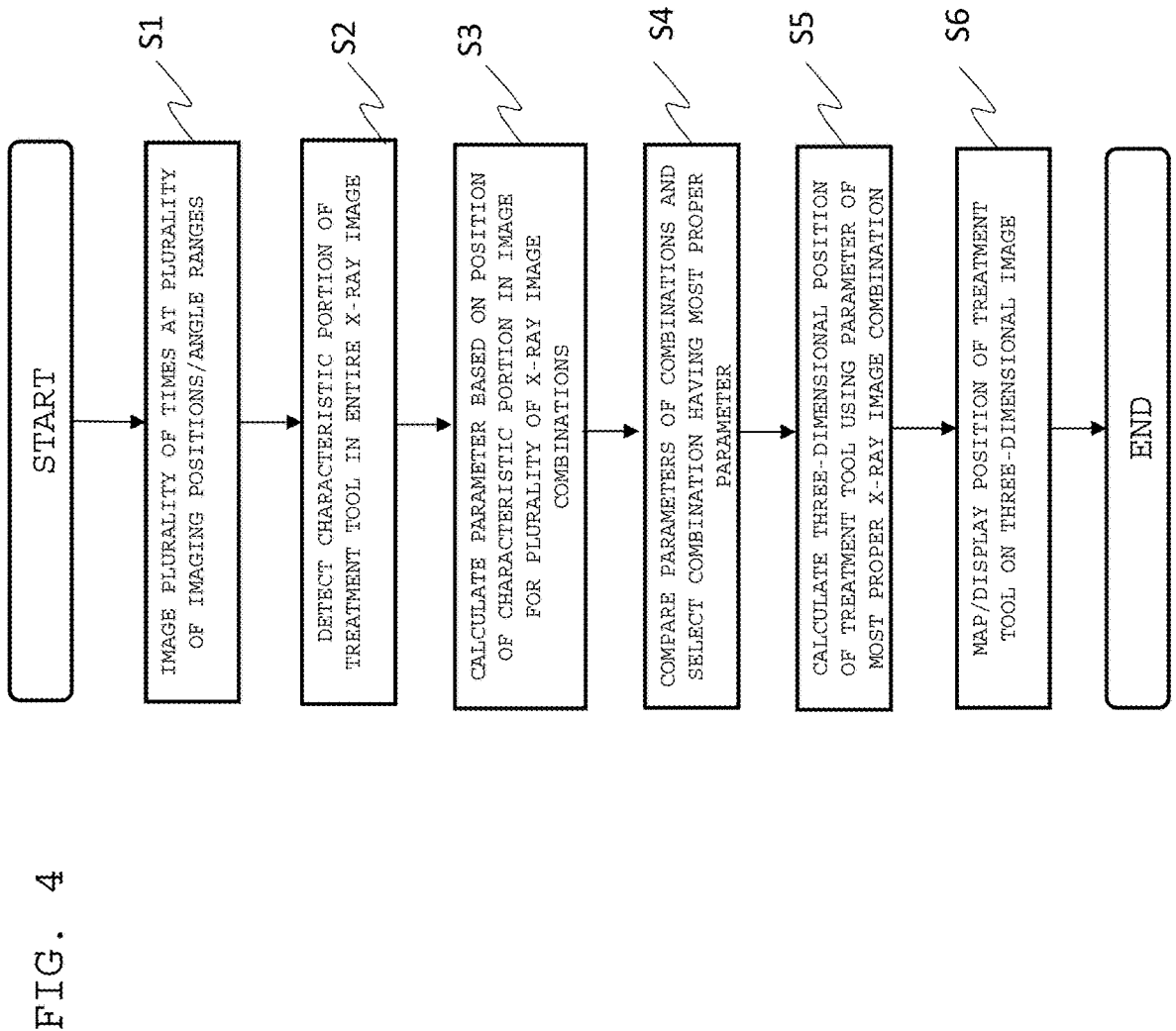
FIG. 4 is a flowchart showing an operation of the x-ray imaging device.

An outline of the imaging and the position calculation of the treatment tool in the above-described configuration is shown in FIG. 4. First, a plurality of X-ray images having different imaging times and imaging positions are acquired under control of the imaging control unit 20 (S1), and then the two-dimensional position detection unit 321 detects the position of a characteristic portion of the treatment tool, for example, a distal end of the treatment tool, using the characteristic (characteristic of a luminance value or a shape) of the treatment tool in the X-ray image (S2). Next, the image selection unit 31 determines a combination of two or more X-ray images that have different imaging positions and that are selected from the plurality of X-ray images, and the parameter calculation unit 322 calculates, for the combination of two or more X-ray images, a parameter for three-dimensional position calculation of the treatment tool using the imaging position (X-ray irradiation angle) when each X-ray image is acquired and the position of the treatment tool in the X-ray image (S3). For example, for two or more X-ray images, a straight line determined by the position of the treatment tool in the X-ray image and the X-ray irradiation angle is set, and the parameter is set based on the shortest distance between the straight lines and the position on each straight line. In this case, a position on a straight line at which the distance is the shortest or the shortest distance itself is the parameter.

The parameter comparison unit 323 compares the parameters of the plurality of combinations, and selects a combination having the highest accuracy of the treatment tool position calculation among the combinations (S4). If the parameter is the shortest distance between a plurality of straight lines, the combination having the smallest parameter is selected as the combination having the highest accuracy. The three-dimensional position calculation unit 324 calculates the three-dimensional position of the treatment tool using the parameter of the combination having the highest accuracy (S5). For example, a midpoint of a linear position at which the linear distance is the highest is set as the three-dimensional position. Thereafter, the calculated three-dimensional position may be mapped and displayed on the three-dimensional image of the subject acquired in advance (S6). The three-dimensional image may be an image obtained by another modality in addition to the X-ray image, and as a method of positioning with respect to the subject, for example, a known mapping method including alignment correction of a calculated projection image created based on the three-dimensional image using an anatomical structure of the subject and the X-ray image can be adopted.

According to the x-ray imaging device in the present embodiment, imaging is performed at a plurality of imaging positions in order to calculate a three-dimensional position, and imaging is performed one time or a plurality of times (two or more times when the imaging position is two) at each position to obtain a plurality of X-ray images. From the plurality of X-ray images, a plurality of combinations of two or more X-ray images having different imaging positions are used to calculate and compare parameters for calculating the three-dimensional position of the treatment tool, and an optimal combination is selected. Accordingly, when the three-dimensional position is calculated based on two or more X-ray images, it is possible to use a combination of images having the same or closest time phase of body movement, and it is possible to calculate the three-dimensional position of the treatment tool with high accuracy while decreasing an influence of the body movement.

Hereinafter, different embodiments of an imaging method and a method of combining two or more images will be described.

First Embodiment

In the present embodiment, imaging is performed a plurality of times at each of at least two different positions, and the three-dimensional position of the treatment tool is calculated using a plurality of X-ray images that are obtained. In the following description, a case will be described as an example in which imaging is performed N times (N is an integer of 2 or more) at two imaging positions having different X-ray irradiation angles.

Although the outline of the configuration of the x-ray imaging device according to the embodiment is similar as the configuration shown in FIG. 1, the imaging control unit 20 sets two imaging positions and the number of times of imaging at each imaging position, and controls the drive unit 21 based on the information. The imaging position and the number of times of imaging may be set by default to a predetermined position (for example, a position where the X-ray source 11 is directly above the bed 13, a position where the X-ray source 11 is moved by 30 degrees, or the like), or the imaging control unit 20 may receive user designation via an input device or the like.

It is preferable that the angle difference between the X-ray irradiation angles of the two imaging positions is 30 degrees or more, thereby improving the accuracy of the three-dimensional position. Although the number of times of imaging at each imaging position is not particularly limited, it is preferable to repeat imaging for approximately one cycle (3 seconds to 4 seconds) of respiratory movement, for example, in order to eliminate the influence of body movement. The number of times of imaging at the two positions may be the same or different. Here, a case of the same number will be described as an example.

The image selection unit 31 of the data processing unit 30 selects two images having different imaging positions as one combination among the N X-ray images obtained at the two imaging positions, selects a plurality of combinations by differentiating the X-ray images to be combined, and passes the plurality of combinations to a treatment tool position calculation unit 32.

Figure 5:
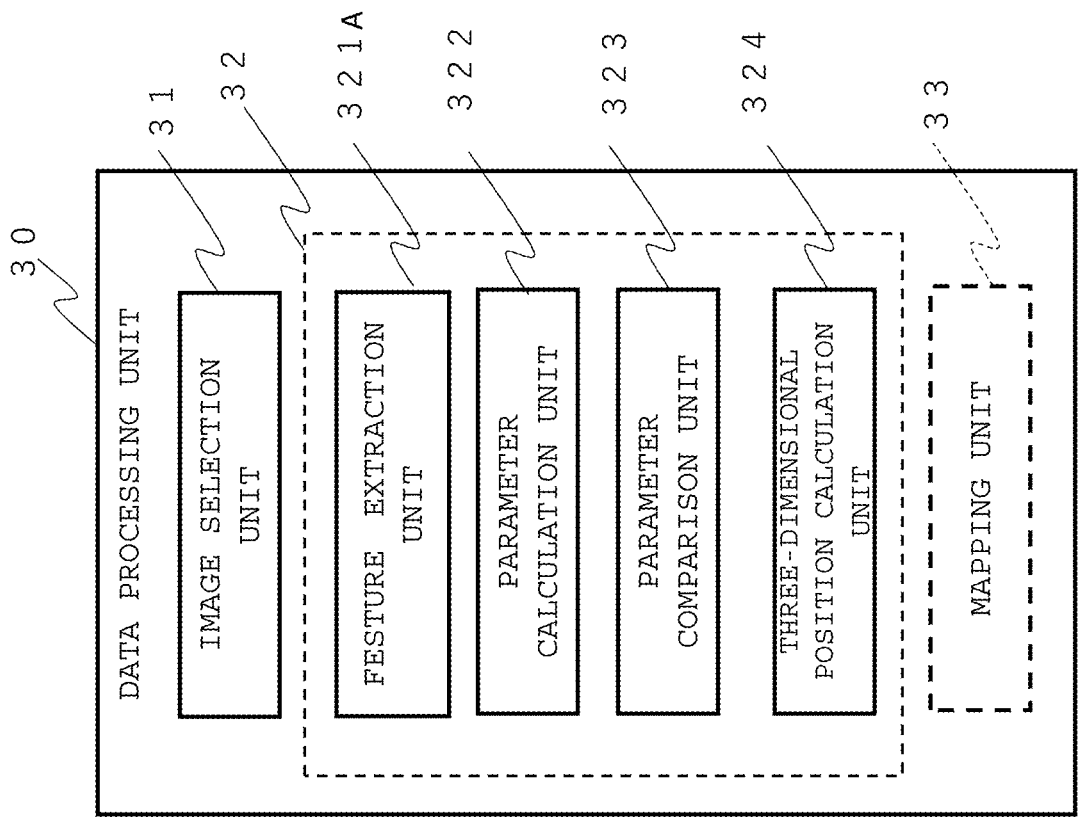
FIG. 5 is a functional block diagram of an image generating unit according to a first embodiment.

As shown in FIG. 5, the treatment tool position calculation unit 32 includes a feature extraction unit 321A that extracts a characteristic portion of the treatment tool in the X-ray image and that detects the position of the feature part. The treatment tool position calculation unit 32 may further include a map generation unit. The feature extraction unit 321A has a function corresponding to the two-dimensional position detection unit 321 in FIG. 1, and in the embodiment, position coordinates of a distal end of the treatment tool are obtained by extracting shape features of the treatment tool in the X-ray image.

Figure 6:
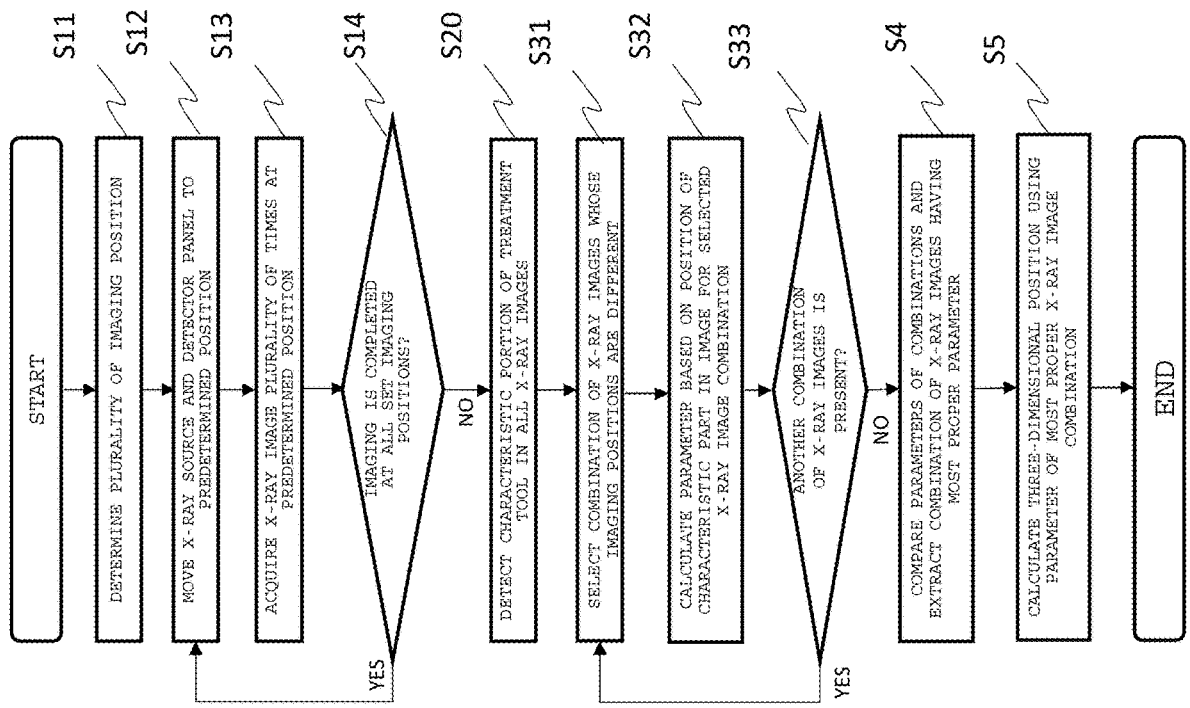
FIG. 6 is a diagram showing a flow of three-dimensional position calculation according to the first embodiment.

Hereinafter, the flow of the imaging procedure and the treatment tool position calculation according to the present embodiment will be described with reference to the flow in FIG. 6. In FIG. 6, steps in which the same processing as those in FIG. 4 are performed are denoted by the same reference numerals.

First, the imaging unit 10 starts imaging for detecting a treatment tool position in accordance with the imaging procedure set in the imaging control unit 20 in step S11. Specifically, the X-ray source 11 is moved to a first imaging position (S12), and here imaging is performed a plurality of times (N times) to acquire N X-ray images (S13).

Next, the X-ray source 11 is moved to a position (second imaging position) different from the first imaging position, and here imaging is performed a plurality of times (N times) to acquire N X-ray images. In the case in which the x-ray imaging device 1 is an overtube fluoroscopy device as shown in FIG. 2A, the support 151 that supports the X-ray source 11 is rotated as shown in FIG. 2B to move the X-ray emitted from the X-ray source 11 to a position irradiated with the X-ray obliquely with respect to the subject, and the subject is imaged.

When imaging is completed a plurality of times at different positions and 2×N X-ray images are acquired (S14), the feature extraction unit 321A detects the position of the treatment tool in each X-ray image (S20). In the detection of the treatment tool, for example, a marker attached to the treatment tool or a characteristic portion such as a distal end of the treatment tool is extracted. In general, since a treatment tool is a high absorption region of X-rays, the treatment tool has a high contrast in an X-ray captured image as compared with a human body structure. The characteristic portion is detected by extracting a high-contrast region based on a difference in contrast between a region indicating the human body structure and a region indicating the treatment tool on the X-ray captured image. A position of the detected characteristic portion is set as a position of the treatment tool in the X-ray image. The feature extraction unit 321A detects the position of the treatment tool for all acquired X-ray images.

The imaging and the detection of the treatment tool position may be performed in parallel. That is, a position detection may be sequentially performed on the acquired X-ray images while the imaging is performed at the second imaging position.

Next, the image selection unit 31 selects a set of X-ray images to be used for parameter calculation from a plurality of (here, 2×N) images (S31). The set of X-ray images is a set of one of a plurality of X-ray images obtained by performing imaging at the first imaging position and one of a plurality of X-ray images obtained by performing imaging at the second imaging position. Therefore, first, it is assumed that the first X-ray images at the imaging positions are combined.

Next, the parameter calculation unit 322 calculates a parameter for the selected set of X-ray images using information on a position of the treatment tool at the time of imaging at a first position and a position of the treatment tool at the time of imaging at a second position (S32). The parameter is a value related to the accuracy of calculation when a three-dimensional position is calculated based on a set of images. In the present embodiment, for the two X-ray images constituting the combination, a position (three-dimensional position) on an X-ray detector panel corresponding to the position of the treatment tool in the X-ray images and a straight line connecting the position and the X-ray source 11 are set, and the parameter is calculated based on a position on the straight line at which the distance between the straight lines is shortest.

Figure 7:
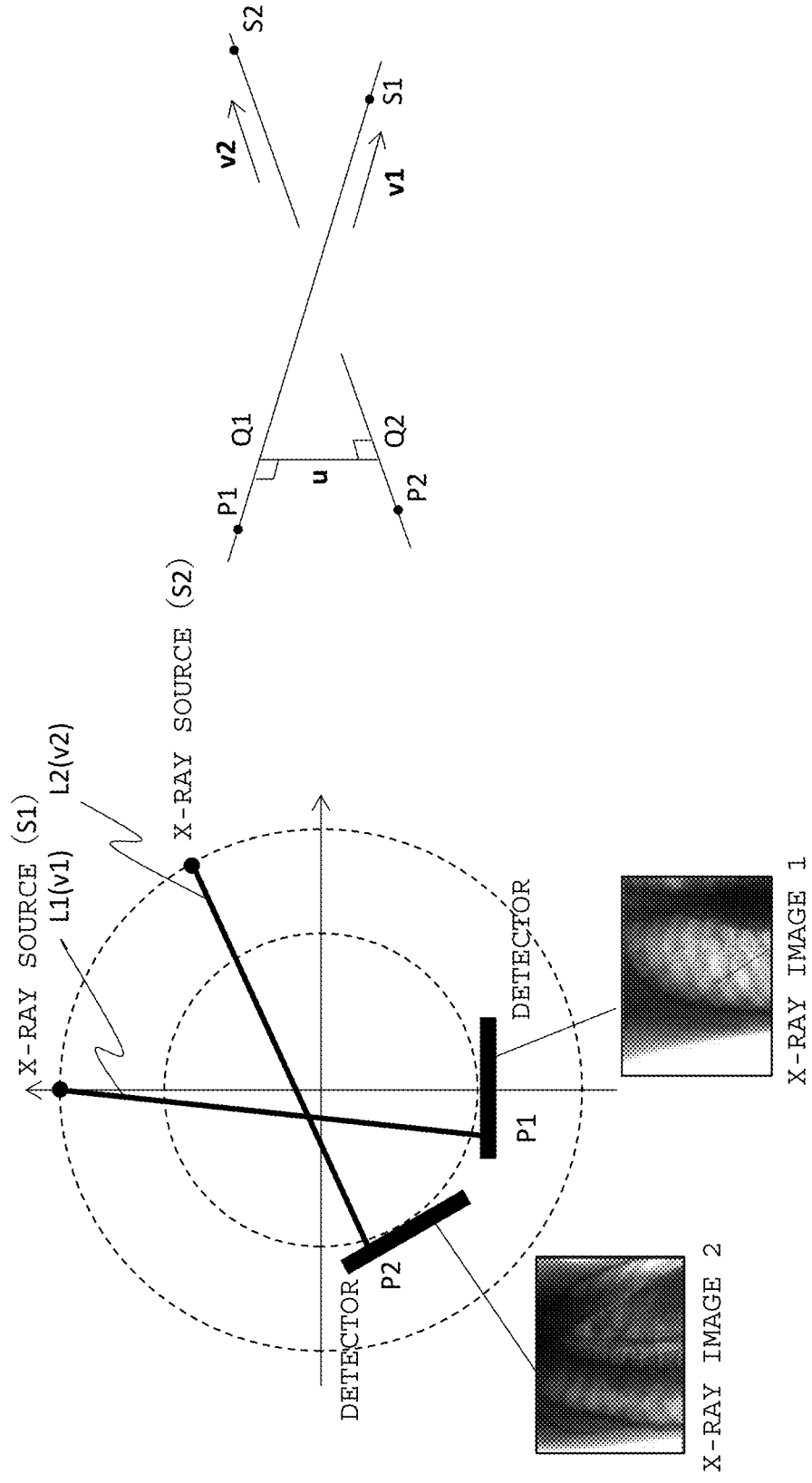
FIG. 7 is a diagram showing a combination of X-ray images in the three-dimensional position calculation according to the first embodiment.

An example of the calculation of the parameters according to the present embodiment will be described with reference to FIG. 7. In FIG. 7, a position of the X-ray source 11 at the first imaging position is denoted by S1, a position at the second imaging position is denoted by S2, and the positions of the treatment tool on the detector panel 12 at the first imaging position and the second imaging position are denoted by P1 and P2. A straight line connecting S1 and P1 is denoted by L1 (a vector thereof is denoted by v1), and a straight line connecting S2 and P2 is denoted by L2 (a vector thereof is denoted by v1). The position P1 and P2 of the treatment tool on the detector panel 12 can be calculated based on a geometric arrangement of the detector panel 12 with respect to the X-ray source 11 and the position of the treatment tool in the X-ray image detected in step S20.

Ideally, the two straight lines L1 and L2 connecting the X-ray source 11 and the treatment tool position intersect with each other at one point in a real space where (the characteristic portion of) the treatment tool is present. However, in practice, there is a "twist" relationship in which the two straight lines L1 and L2 do not intersect at one point due to the body movement and the like of the subject in addition to a device error and a measurement error. A right side of FIG. 7 shows a state in which the straight lines L1 and L2 are in the twist relationship. In order to calculate a position closest to the treatment tool, the parameter calculation unit 322 first calculates a position on a straight line at which two straight lines are at the shortest distance. The positions Q1 and Q2 can be calculated according to the following equations (1-1) and (1-2) using the positions S1 and S2 of the X-ray source and vectors v1 (=S1−P1) and v2 (=S2−P2) of the straight lines L1 and L2.

$$Q1 = S1 + (D1 - D2 \times Dv)/(1 - Dv \times Dv) \times v1 \quad (1\text{-}1)$$

$$Q2 = S2 + (D2 - D1 \times Dv)/(Dv \times Dv - 1) \times v2 \quad (1\text{-}2)$$

in which $D1 = (P2 - P1) \times v1$
$D2 = (P2 - P1) \times v2$
$Dv = v1 \times v2$ When the positions Q1 and Q2 on the straight line where the straight lines L1 and L2 are at the shortest distance are calculated, the parameter calculation unit 322 obtains a line segment (vector) u connecting the positions Q1 and Q2, and uses the line segment (vector) u as a parameter.

Figure 8:
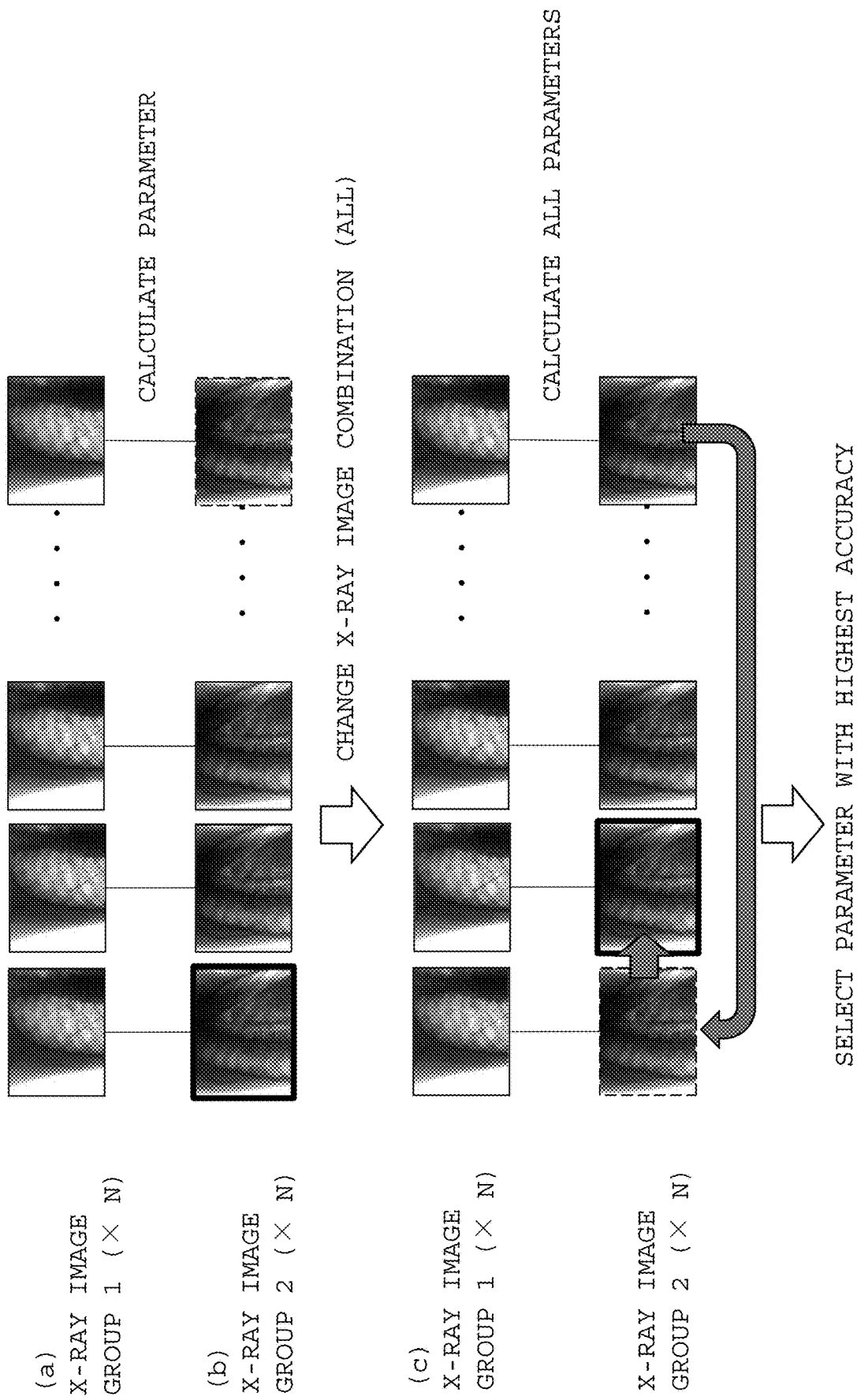
FIG. 8 is a diagram for explaining parameter calculation.

The image selection unit 31 selects another combination (a set of X-ray images having different imaging positions) from the plurality of X-ray images acquired in steps S11 to S14 (S33, S31), and the parameter calculation unit 322 calculates a parameter for the newly selected combination in a similar manner as described above (S32). FIG. 8 shows an example of a method in which the image selection unit 31 sequentially selects a set of X-ray images from a plurality of X-ray images. (a) of FIG. 8 shows N X-ray image groups 1 acquired at the first imaging position, and (b) of FIG. 8 shows N X-ray image groups 2 acquired at the second imaging position. The N X-ray image groups 1 and the N X-ray image groups 2 are in a state of being arranged in an order of acquisition. First, the image selection unit 31 combines the same n-th (any one of n=1 to N) X-ray images from the X-ray image group 1 and the X-ray image group 2 in (a) and (b) of FIG. 8, and passes the combined X-ray images to the parameter calculation unit 322. Next, as shown in (c) of FIG. 8, the n-th X-ray image and the (n−1)-th X-ray image are combined (first X-ray image in the X-ray image group 1 is combined with the N-th X-ray image in the X-ray image group 2), and the combined X-ray images are passed to the parameter calculation unit 322. Thereafter, similarly, the combination is changed while shifting the image of the X-ray image group 2 to be combined with the image of the X-ray image group 1, and the parameter calculation unit 322 calculates the parameter for each combination. Finally, a parameter is obtained for a combination of N×N.

When the parameters have been calculated for all combinations, the parameter comparison unit 323 compares the parameters (here, the shortest distance u between the two straight lines), and selects the combination whose shortest distance is the shortest (S4). As described with reference to FIG. 7, ideally, the two straight lines L1 and L2 intersect with each other at the position of the treatment tool. It can be said that, as Q1 and Q2 are closer to each other, a degree of coincidence of the treatment tool positions between the two images is higher, and the accuracy of the three-dimensional position calculation is higher.

The three-dimensional position calculation unit 324 calculates the three-dimensional position of the treatment tool according to the following equation (2) using the combination of X-ray images selected by the parameter comparison unit 323. That is, a midpoint between Q1 and Q2 is set as the three-dimensional position of the treatment tool (S5).

$$Q = (Q1 + Q2)/2 \qquad (2)$$

When the data processing unit 30 includes a mapping unit 33, the data processing unit 30 maps the calculated three-dimensional position to the three-dimensional image of the subject acquired in advance, and displays the three-dimensional image on the display unit (S6).

As described above, according to the present embodiment, for the combination of a plurality of two-dimensional images, the parameter related to the three-dimensional position of the treatment tool is calculated, and the three-dimensional position is calculated using the combination that is the optimal parameter. Accordingly, even if the body moves or the like while the X-ray source is moved to a different imaging position or while imaging is repeated at each imaging position, since the three-dimensional position is calculated based on the images estimated to be acquired when body movement time phases are the same or closest to one another, the three-dimensional position of the treatment tool can be accurately calculated without being affected by the body movement. In order to eliminate the influence of body movement, an external signal from a body movement monitor is not required, and a system configuration when intraoperative imaging or the like is performed can be simplified.

In the first embodiment described above, a case has been described in which a plurality of X-ray images respectively acquired at two imaging positions are combined in a round-robin manner. However, since the parameters may be calculated for a plurality of combinations, the method and the number of combinations are not limited to this example.

In the first embodiment, imaging is performed at two different imaging positions, and two X-ray images having different imaging positions are combined to calculate a parameter. However, it is also possible to calculate parameters by performing imaging at three or more imaging positions and combining three or more X-ray images. In this case, for example, positions Q1 to Qm (m is an integer of 3 or more) at which the distance between two straight lines of straight lines (a plurality of straight lines) connecting the X-ray source and the treatment tool position determined according to each imaging position is the shortest are calculated, and an area or an outer circumferential length of a figure such as a polygon defined by the positions Q1 to Qm may be used as a parameter. When the parameter is an area, the three-dimensional position of the treatment tool is set as a position of the center of gravity of an area of the combination having the minimum parameter.

Second Embodiment

In the first embodiment, imaging is performed a plurality of times at each of two or more imaging positions. However, in the present embodiment, imaging is performed once while the imaging position (irradiation angle) is changed at a predetermined pitch, and the three-dimensional position of the treatment tool is calculated using a plurality of X-ray images that are obtained.

The configurations of the data processing unit 30 and the treatment tool position calculation unit 32 according to the present embodiment are similar as those according to the first embodiment. However, the image selection unit 31 divides a plurality of X-ray images having different angles into a plurality of groups in a manner of having periodicity, and selects a combination of images for which parameters are calculated from X-ray images included in at least two image groups.

Figure 9:
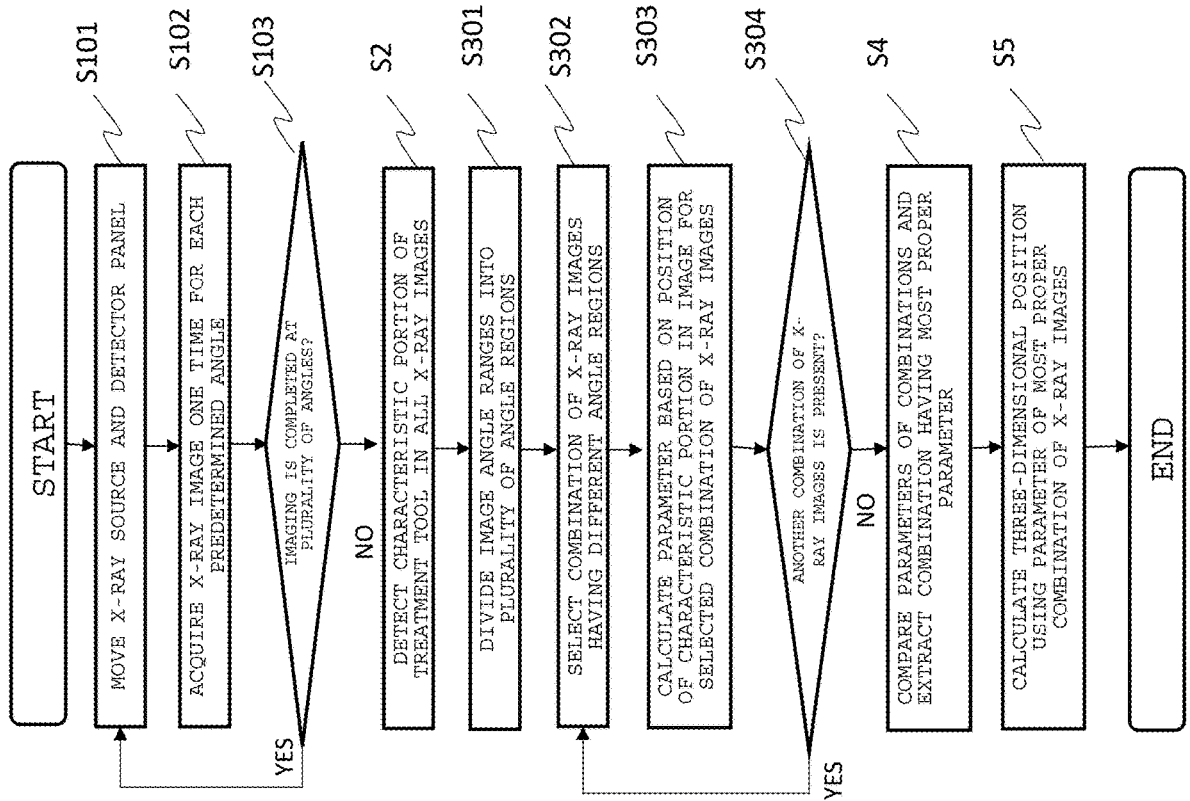
FIG. 9 is a diagram showing a flow of three-dimensional position calculation according to a second embodiment.

Hereinafter, with reference to FIGS. 9 and 10, an operation of the x-ray imaging device according to the present embodiment will be described focusing on differences from the first embodiment. FIG. 9 shows a flow of the treatment tool position calculation according to the present embodiment. In FIG. 9, the same steps as those in FIG. 6 are denoted by the same reference numerals, and redundant description thereof will be omitted.

First, the imaging unit 10 starts imaging for detecting a treatment tool position in accordance with the imaging procedure set in the imaging control unit 20. In the present embodiment, while the X-ray source 11 is sequentially moved from an initial position to a predetermined imaging position (S101), one time of X-ray irradiation is performed at each angle (each imaging position) to acquire M X-ray images (S102 and S103). Although the angle difference (θ)

between one time of imaging and the next time of imaging is not particularly limited, the angle difference (θ) is preferably large, and is set to, for example, 1 degree to several degrees.

The feature extraction unit 321 detects the position of the treatment tool in the X-ray image for each of the acquired X-ray images (S2). A position detection method is similar as that according to the first embodiment, and a characteristic portion of the treatment tool is extracted based on a shape of the characteristic portion to detect a position.

Next, the image selection unit 31 selects a combination of two or more X-ray images having different imaging positions from the acquired X-ray images, and the parameter calculation unit 322 calculates a parameter for three-dimensional position calculation for the combination. At this time, the combination of the two or more X-ray images has a constant angle difference between the two or more X-ray images, and preferably an angle difference of 30 degrees or more. Therefore, as shown in FIG. 10, the image selection unit 31 divides a plurality of (M) X-ray images obtained by performing imaging into groups according to imaging positions (angles at the time of imaging) (S301), and selects a combination of images having an angle difference equal to or greater than a certain value from the groups (S302). In the example shown in FIG. 10, the X-ray images are divided into k (k is an integer of 2 or more) groups from 1 to k, with the number of images included in one group as n, in order from an image having a small angle difference from the initial position, and two groups in which the maximum angle in the group and the minimum angle in the group are a certain angle or more are selected. Here, the first group and k-th group (X-ray image group 1 and X-ray image group k) are selected, and combinations are sequentially selected such that n X-ray images of the X-ray image group 1 are combined with n X-ray images of the X-ray image group k. For example, when an angle range of the X-ray image group 1 is 0 degrees to 10 degrees and an angle range of the X-ray image group k is 40 degrees to 50 degrees, the angle difference is 30 degrees or more in all combinations of the X images selected from these groups.

Figure 10:
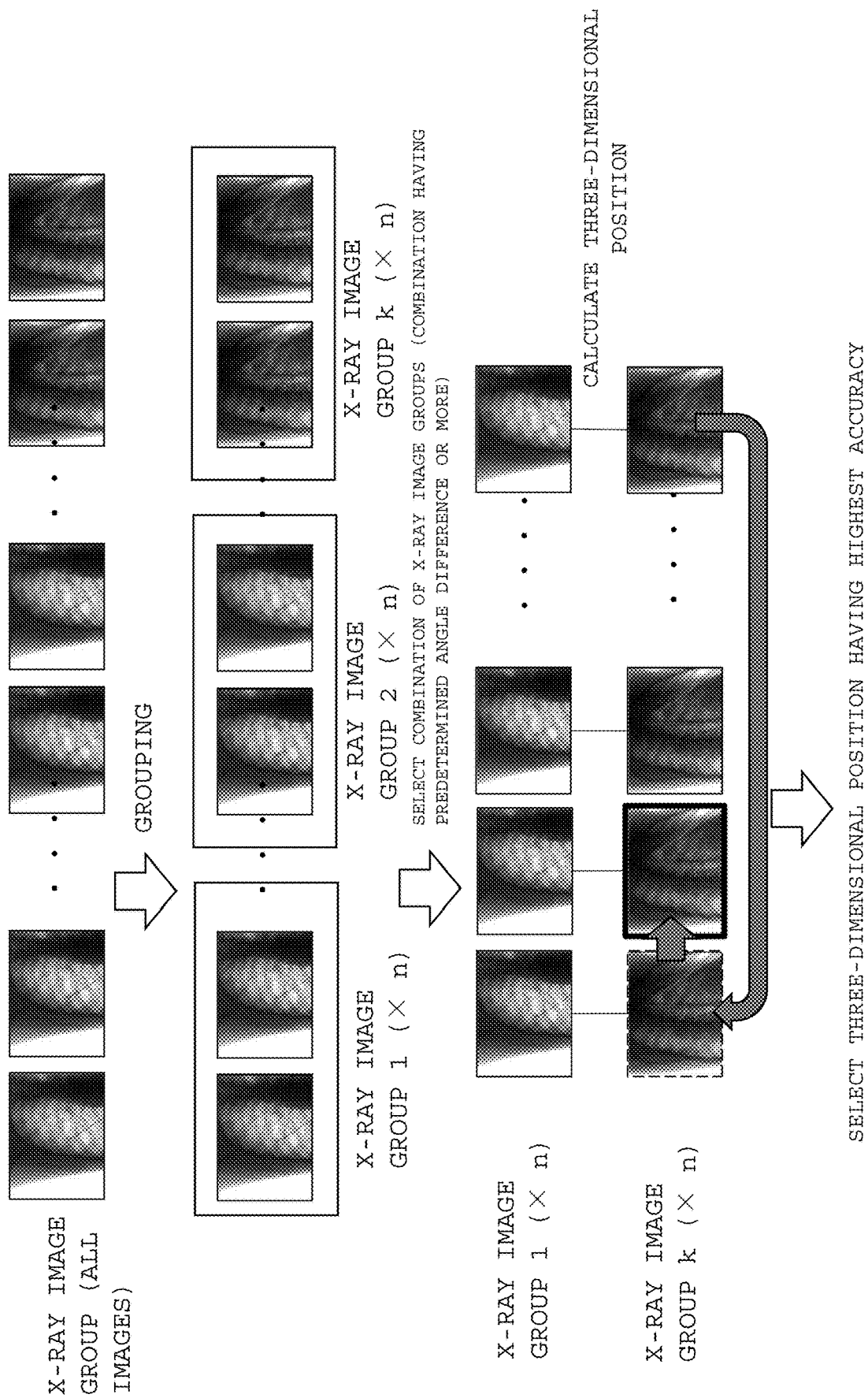
FIG. 10 is a diagram showing a combination of X-ray images in the three-dimensional position calculation according to the second embodiment.

Assuming that angle ranges of the X-ray image groups 2 to 4 shown in FIG. 10 are 10 to 20, 20 to 30, and 30 to 40, respectively, even when images having the same imaging order in the group are combined in the combination of the X-ray image group 1 and the X-ray image group 3 or the combination of the X-ray image group 2 and the X-ray image group 4, the combination is a combination having a certain angle difference or more, and thus these combinations may be added to the combination of the X-ray image group 1 and the X-ray image group k described above. Accordingly, the X-ray images of all cycles of the body movement can be provided in the parameter calculation and the comparison.

Figure 11:
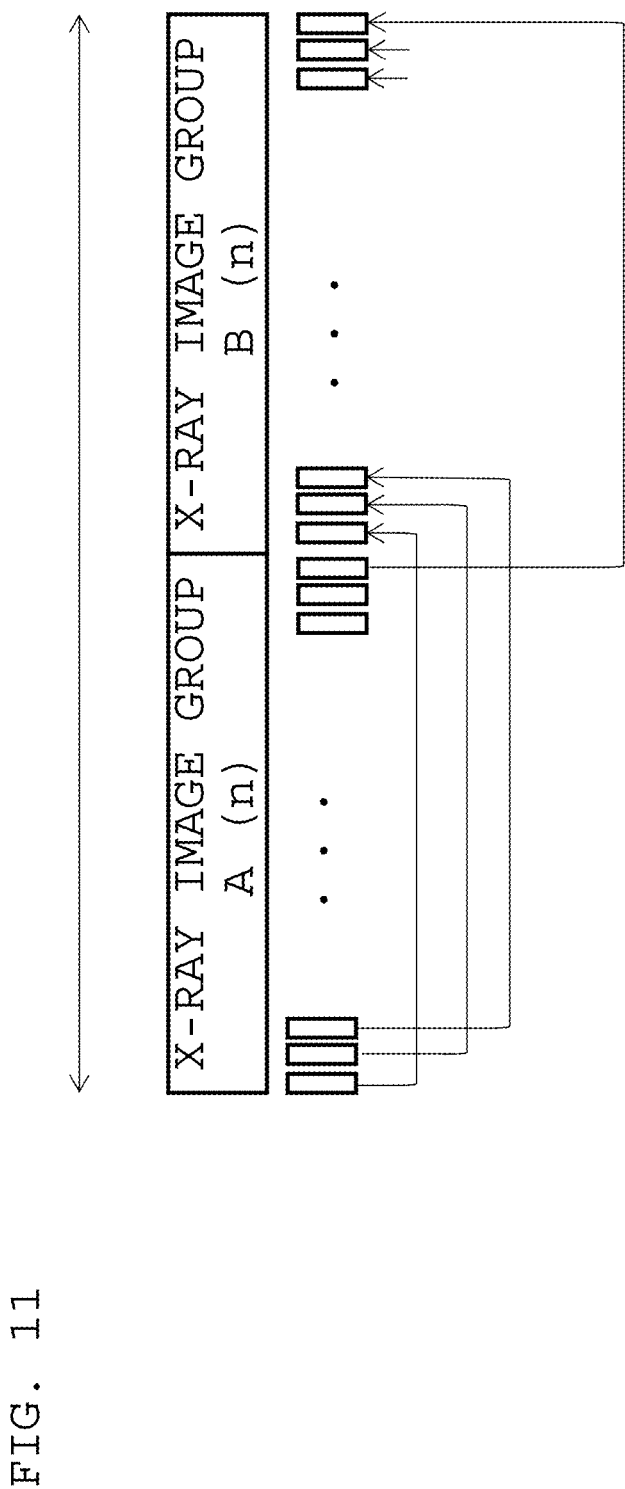
FIG. 11 is a diagram illustrating a modification of the combination of X-ray images according to the second embodiment.

Further, as shown in FIG. 11, 1 to M X-ray images acquired in a predetermined angle range may be divided into two at imaging positions having a predetermined angle difference (for example, 30 degrees or more) with respect to an initial imaging position to form an X-ray image group A of the 1 to m X-ray images and an X-ray image group B of m+1 to M X-ray images. A first image of the X-ray image group A and the m+1 to M X-ray images of the X-ray image group B may be sequentially combined, a second image of the X-ray image group A and m+2 to M X-ray images of the X-ray image group B may be sequentially combined, and similarly, a j-th (in which j m and m+j≤M) image of the X-ray image group A and X-ray images from m+j to M may be sequentially combined to form a plurality of combinations.

A method for calculating a parameter for each combination is similar as that according to the first embodiment, and the parameter is calculated based on a straight line determined by the treatment tool position (position of the feature part) in the X-ray image constituting the combination and the position (angle) of the X-ray source 11 when the X-ray image is acquired (S303). The parameter is, for example, a length of a line segment connecting positions (Q1 and Q2 in FIG. 7) on a straight line at which two straight lines are at the shortest distance.

Finally, parameters are calculated for a combination of n×n in the example in FIG. 10, and for a combination of n×n+2n in the modification in FIG. 10 (S304).

Processing after the parameter calculation is similar as that according to the first embodiment, and the parameter comparison unit 323 compares the parameters calculated for all the combinations, and selects a combination having the smallest parameter (distance of the line segment) (S4). The three-dimensional position calculation unit 324 calculates a midpoint between positions of the two points (Q1, Q2) of the selected combination as a three-dimensional position of the treatment tool (S5). The three-dimensional position of the treatment tool is mapped on the three-dimensional image as necessary and displayed on a display unit 40 (S6).

According to the present embodiment, similarly to the first embodiment, the three-dimensional position of the treatment tool can be accurately calculated without being affected by the body movement of the subject.

Also in the present embodiment, it is possible to calculate parameters not only by combining two images but also by combining X-ray images of three or more imaging regions among a plurality of (three or more) divided imaging regions (angle ranges).

Third Embodiment

In the first and second embodiments, the parameters calculated for a plurality of combinations are compared with one another, and a combination with which an optimum result is obtained is selected. However, in the present embodiment, a threshold value is set for the parameter in advance, and it is determined whether to perform subsequent position calculation according to a result of the comparison with the threshold value.

During the imaging, for example, when there is a positional change other than a periodic movement of the subject between the imaging at the first imaging position and the imaging at the second imaging position, the shortest distance between two straight lines or a plurality of straight lines used for the calculation of the parameters changes irreversibly. In this case, the accuracy of the calculation of the three-dimensional position based on the parameter is fairly reduced. In the present embodiment, using the threshold value, it is determined whether there is a positional change other than the periodic movement, and it is determined whether to perform the three-dimensional position calculation using the parameter.

Figure 12:
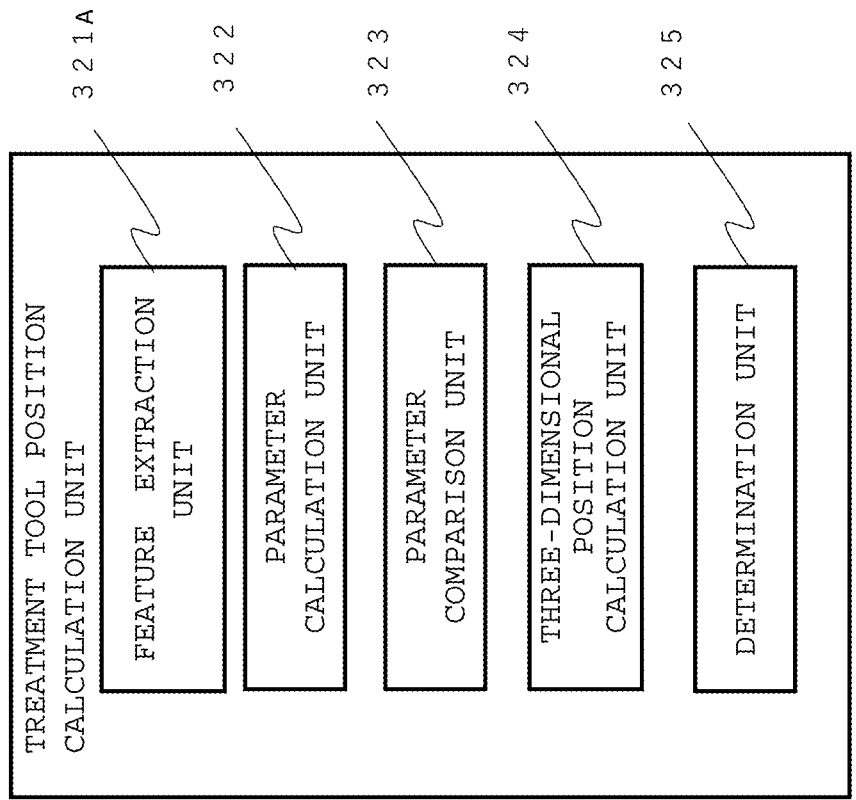
FIG. 12 is a functional block diagram of an image generating unit according to a third embodiment.

FIG. 12 shows a configuration of the treatment tool position calculation unit 32 according to the present embodiment. In the present embodiment, a determination unit 325 is added to the configuration shown in FIG. 5. In addition to a function of comparing the parameters with each other, a function of comparing the parameter with a threshold value (a function serving as a comparison unit) is added to the parameter comparison unit 323. The other elements denoted by the same reference numerals as those in FIG. 5 have similar functions as those in FIG. 5. The threshold used for the parameter comparison by the parameter comparison unit 323 may be set in the computer functioning as the data processing unit 30 in consideration of, for example, the accuracy of the three-dimensional position desired by the user, or may be set as a default and stored in a memory or the like.

Figure 13:
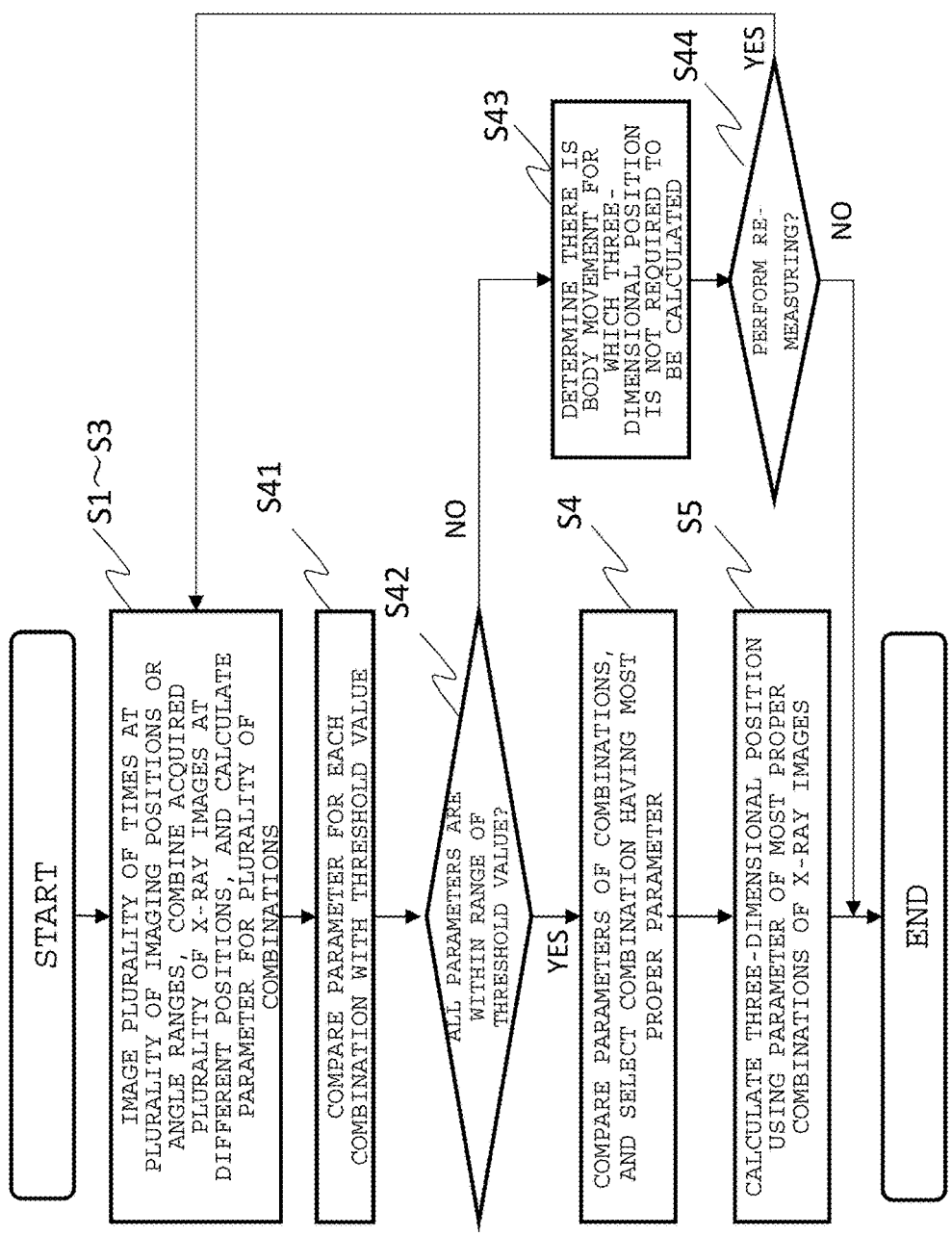
FIG. 13 is a diagram showing a processing flow according to the third embodiment.

Next, a procedure of calculating a treatment tool position in the x-ray imaging device according to the present embodiment will be described with reference to a flow in FIG. 13.

Imaging is performed using the imaging method according to the first embodiment or the second embodiment to acquire a plurality of X-ray images (S1), a treatment tool position is detected by feature extraction for each X-ray image (S2), a combination of two or more X-ray images having different imaging positions is sequentially selected according to the imaging method, and a parameter of the combination is calculated (S3).

The parameter comparison unit 323 compares the calculated parameter with the threshold value (S41), and sets only the parameter within the threshold value as a parameter to be used in the subsequent processing. As a result of comparing all parameters with the threshold value, when all parameters exceed the threshold value (S42), the determination unit 35 regards that there is an irreversible position change of the subject during imaging (S43), and performs re-imaging or stops imaging without performing subsequent processing (S44). When there is a parameter equal to or less than the threshold value, a combination that is the smallest parameter is selected among the parameters, and the three-dimensional position of the treatment tool is calculated (S4 and S5). Although FIG. 13 shows a case in which all the parameters exceed the threshold value, it is also possible to adopt a configuration in which, when some of the parameters exceed the threshold value, it is considered that there is a positional change.

According to the present embodiment, when there is a positional change other than the periodic movement of the subject, it is possible to prevent the calculation accuracy of the treatment tool position from being decreased.

Although the embodiments of the x-ray imaging device according to the invention have been described above, the numerical values and the like described in the embodiments are merely examples, and the invention is not limited thereto. The methods according to the embodiments can be appropriately combined as long as there is no technical contradiction. For example, in the first embodiment, a case in which imaging is performed a plurality of times at each of a plurality of positions has been described, and in the second embodiment, a case in which imaging is performed once in a predetermined angle range has been described. However, a combination of X-ray images for which a parameter is calculated is a combination of X-ray images having different imaging positions, and it is sufficient that a plurality of X-ray images can be acquired such that a plurality of combinations include a temporal change. An intermediate method between the first embodiment and the second embodiment such as performing imaging twice in a predetermined angle range can be adopted, and such a method is also included in the invention.

What is claimed is:

1. An x-ray imaging device configured for obtaining a three-dimensional position of a treatment tool in an inspection object, the x-ray imaging device comprising:
   an X-ray source that emits X-rays;
   an X-ray detector that faces the X-ray source across an inspection object;
   an imaging control unit that controls irradiation and an irradiation angle of the X-rays with respect to the inspection object, the imaging control unit controlling the X-ray source and the X-ray detector to perform imaging a plurality of times at a plurality of imaging positions having different irradiation angles or within a predetermined angle range of the irradiation angle; and
   a data processing unit that generates an X-ray image of the inspection object based on the X-rays transmitted through the inspection object and detected by the X-ray detector,
   the data processing unit including a treatment tool position calculation unit that analyzes the X-ray image of the inspection object and that calculates a three-dimensional position of a treatment tool in the inspection object, the treatment tool position calculation unit including:
      a parameter calculation unit that calculates a parameter for three-dimensional position calculation of the treatment tool, for each of a plurality of combinations of two or more X-ray images having different imaging positions, among a plurality of X-ray images obtained by performing the imaging a plurality of times;
      a parameter comparison unit that compares parameters of the combinations and that selects a combination corresponding to a parameter having a highest accuracy of the three-dimensional position calculation; and
      a three-dimensional position calculation unit that calculates, using the parameter calculated by the parameter calculation unit for the combination selected by the parameter comparison unit as corresponding to the parameter having the highest accuracy of the three-dimensional position calculation, a three-dimensional position of the treatment tool,
   wherein the treatment tool position calculation unit further includes a feature extraction unit that extracts a feature of the treatment tool from the X-ray image and that calculates a position of the treatment tool in the X-ray image, and
   the parameter calculation unit calculates, for the two or more X-ray images, the parameter based on the position of the treatment tool in the X-ray image calculated by the feature extraction unit and information on an imaging position when the two or more X-ray images are acquired, and
   the parameter calculation unit sets, for the two or more X-ray images, a straight line determined according to a position on the X-ray detector corresponding to the position of the treatment tool in the X-ray image and an X-ray irradiation angle at the imaging position, and calculates the parameter using a position on each straight line at which a distance between the straight lines is the shortest.

2. The x-ray imaging device according to claim 1, wherein the parameter calculation unit sets, as the parameter, a distance between positions on straight lines obtained for the two or more X-ray images, and
   the parameter comparison unit selects a combination of the two or more X-ray images in which a distance between the positions on straight lines is minimum as a combination having the highest accuracy of three-dimensional position calculation.

3. The x-ray imaging device according to claim 1, wherein
the combination of X-ray images for which the parameter is calculated is a combination of three or more X-ray images, and the parameter calculation unit sets the straight line for each of the three or more X-ray images, and sets an area or a peripheral length of a figure defined by a position on each straight line at which a distance between adjacent straight lines is the shortest as the parameter, and
the parameter comparison unit selects a combination of the three or more X-ray images in which the area or the peripheral length is minimum as a combination having the highest accuracy of three-dimensional position calculation.

4. The x-ray imaging device according to claim 1, wherein
the imaging control unit performs control to perform imaging a plurality of times at each of a plurality of imaging positions, and
the parameter calculation unit sets a plurality of combinations of a plurality of X-ray images obtained for each imaging position to be different from one another, and calculates the parameter for each of the plurality of combinations.

5. The x-ray imaging device according to claim 1, wherein
the imaging control unit performs control to perform imaging one time at each of a plurality of imaging positions within a predetermined angle range, and
the parameter calculation unit sets a plurality of combinations of a plurality of X-ray images obtained at different imaging positions in the angle range to be different from one another, and calculates the parameter for each of the plurality of combinations.

6. The x-ray imaging device according to claim 1, further comprising:
a determination unit that compares the parameter calculated by the parameter calculation unit with a preset threshold value and that determines a position change of the inspection object based on a comparison result.

7. The x-ray imaging device according to claim 6, wherein
the determination unit determines that there is a movement other than a periodic body movement in the inspection object when values of all parameters calculated by the parameter calculation unit for a plurality of combinations exceed the threshold value.

8. The x-ray imaging device according to claim 1, further comprising:
a mapping unit that maps the three-dimensional position of the treatment tool calculated by the three-dimensional position calculation unit on a three-dimensional image of the inspection object acquired in advance and that displays the three-dimensional position on a display unit.

9. A treatment tool recognition method, performed by an x-ray imaging device, of analyzing a plurality of X-ray images obtained by the x-ray imaging device by performing imaging a plurality of times at a plurality of imaging positions at which X-ray irradiation angles with respect to an inspection object are different or within a predetermined angle range of the irradiation angles, and recognizing a three-dimensional position of a treatment tool inserted into the inspection object during X-ray imaging, the treatment tool recognition method performed by the x-ray imaging device comprising:
a parameter calculating step of calculating a parameter for three-dimensional position calculation of the treatment tool for each of a plurality of combinations of two or more X-ray images having different imaging positions, among the plurality of X-ray images;
a selecting step of selecting, based on the parameter, a combination that is a parameter having a highest accuracy of three-dimensional position calculation among a plurality of combinations; and
a treatment tool position calculating step of calculating, using the parameter calculated in the parameter calculating step for the combination selected in the selecting step as corresponding to the parameter having the highest accuracy of the three-dimensional position calculation, a three-dimensional position of the treatment tool;
a step of extracting a feature part of the treatment tool in an X-ray image of the X-ray images and detecting a position of the treatment tool in the X-ray image; and
a step of setting a straight line determined according to the position of the treatment tool and X-ray irradiation angles when the two or more X-ray images are acquired,
the parameter being calculated in the parameter calculating step using a position on each straight line at which a distance between straight lines is the shortest.

10. The treatment tool recognition method according to claim 9 further comprising:
setting as the parameter a distance between positions on straight lines obtained for the two or more X-ray images; and
selecting a combination of the two or more X-ray images in which a distance between the positions on straight lines is minimum as a combination having the highest accuracy of three-dimensional position calculation.

11. The treatment tool recognition method according to claim 9 wherein the combination of X-ray images for which the parameter is calculated is a combination of three or more X-ray images, and the treatment tool recognition method further comprises:
setting the straight line for each of the three or more X-ray images, and setting an area or a peripheral length of a figure defined by a position on each straight line at which a distance between adjacent straight lines is the shortest as the parameter; and
selecting a combination of the three or more X-ray images in which the area or the peripheral length is minimum as a combination having the highest accuracy of three-dimensional position calculation.

12. The treatment tool recognition method according to claim 9 further comprising:
performing control to perform imaging a plurality of times at each of a plurality of imaging positions; and
setting a plurality of combinations of a plurality of X-ray images obtained for each imaging position to be different from one another, the parameter the parameter being calculated for each of the plurality of combinations.

13. The treatment tool recognition method according to claim 9 further comprising:
performing control to perform imaging one time at each of a plurality of imaging positions within a predetermined angle range; and
setting a plurality of combinations of a plurality of X-ray images obtained at different imaging positions in the angle range to be different from one another, the parameter being calculated for each of the plurality of combinations.

14. The treatment tool recognition method according to claim 9 further comprising:
   comparing the parameter with a preset threshold value; and
   determining a position change of the inspection object based on a comparison result.

15. The treatment tool recognition method according to claim 14 further comprising:
   determining that there is a movement other than a periodic body movement in the inspection object when values of all of the parameters calculated for a plurality of combinations exceed the threshold value.

16. The treatment tool recognition method according to claim 9 further comprising:
   mapping the three-dimensional position of the treatment tool on a three-dimensional image of the inspection object acquired in advance; and
   displaying the three-dimensional position.

\* \* \* \* \*